United States Patent
Tanaka et al.

(10) Patent No.: US 8,361,676 B2
(45) Date of Patent: Jan. 29, 2013

(54) SOLID POLYMER TYPE FUEL CELL SEPARATOR AND METHOD OF PRODUCTION OF SAME

(75) Inventors: Koki Tanaka, Futtsu (JP); Youichi Ikematsu, Futtsu (JP); Hiroshi Kihira, Futtsu (JP); Michio Kaneko, Futtsu (JP); Wataru Hisada, Kitanagoya (JP); Tamotsu Itoh, Kitanagoya (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 13/227,423

(22) Filed: Sep. 7, 2011

(65) Prior Publication Data

US 2012/0034372 A1 Feb. 9, 2012

Related U.S. Application Data

(62) Division of application No. 12/224,429, filed as application No. PCT/JP2007/054143 on Feb. 27, 2007.

(30) Foreign Application Priority Data

Feb. 27, 2006 (JP) ................................. 2006-050934

(51) Int. Cl.
*H01M 8/04* (2006.01)
(52) U.S. Cl. ........ 429/514; 429/522; 429/512; 429/513; 427/115; 427/126.1; 427/421.1; 427/180
(58) Field of Classification Search .................. 429/517, 429/518, 514, 522, 535; 427/115, 126.1, 427/421.1, 180; *H01M 2/14, 2/16, 2/18, H01M 4/64, 8/00, 8/04*
See application file for complete search history.

(56) References Cited

U.S. PATENT DOCUMENTS

| | | | |
|---|---|---|---|
| 6,379,476 B1 | 4/2002 | Tarutani et al. | |
| 2001/0006702 A1 | 7/2001 | Hisada et al. | |
| 2004/0101738 A1 | 5/2004 | Tawfik et al. | |
| 2005/0084730 A1 | 4/2005 | Ohtani et al. | |
| 2005/0238873 A1 | 10/2005 | Brady et al. | |
| 2006/0121329 A1* | 6/2006 | Shishitani et al. | 429/34 |
| 2009/0013904 A1* | 1/2009 | Hisada et al. | 106/287.18 |

FOREIGN PATENT DOCUMENTS

| | | |
|---|---|---|
| EP | 1 046 723 A1 | 10/2000 |
| EP | 1 094 535 A1 | 4/2001 |
| EP | 1 369 942 A2 | 12/2003 |
| JP | 11-121018 A | 4/1999 |
| JP | 11-126621 A | 5/1999 |
| JP | 11-126622 A | 5/1999 |
| JP | 11-219713 A | 8/1999 |
| JP | 11-260383 A | 9/1999 |
| JP | 2000-21419 A | 1/2000 |
| JP | 2000-256808 A | 9/2000 |
| JP | 2000-260439 A | 9/2000 |
| JP | 2000-309854 A | 11/2000 |

(Continued)

*Primary Examiner* — Jennifer Michener
*Assistant Examiner* — Heng Chan
(74) *Attorney, Agent, or Firm* — Birch, Stewart, Kolasch & Birch, LLP

(57) ABSTRACT

The present invention provides a method of production of a separator for a solid polymer type fuel cell characterized by shaping a substrate comprised of stainless steel, titanium, or a titanium alloy and then spraying the substrate surface with superhard core particles comprised of conductive compound particles of an average particle size of 0.01 to 20 μm mixed with a coating material and coated on their surfaces under conditions of a spray pressure of 0.4 MPa or less and a spray amount per $cm^2$ of the substrate of 10 to 100 g in blast treatment. The ratio of the conductive compound to the mass of the core particles is 0.5 to 15 mass %.

1 Claim, 2 Drawing Sheets

FOREIGN PATENT DOCUMENTS

| | | |
|---|---|---|
| JP | 2001-6713 A | 1/2001 |
| JP | 2001-32056 A | 2/2001 |
| JP | 2001-250565 A | 9/2001 |
| JP | 2001-283872 A | 10/2001 |
| JP | 2001-357862 A | 12/2001 |
| JP | 2003-123783 A | 4/2003 |
| JP | 2003-178768 A | 6/2003 |
| JP | 2003-193206 A | 7/2003 |
| JP | 2003-223904 A | 8/2003 |
| JP | 2004-2960 A | 1/2004 |
| JP | 2004-107704 A | 4/2004 |
| JP | 2004-124197 A | 4/2004 |
| JP | 2004-156132 A | 6/2004 |
| JP | 2004-232074 A | 8/2004 |
| JP | 2004-265695 A | 9/2004 |
| JP | 2004-269969 A | 9/2004 |
| JP | 2004-273370 A | 9/2004 |
| JP | 2004-306128 A | 11/2004 |
| JP | 2006-140009 A | 6/2006 |
| JP | 2006-140095 A | 6/2006 |
| WO | WO 2005047567 A1 * | 5/2005 |
| WO | WO 2006/137584 A1 | 12/2006 |

* cited by examiner

SOLID POLYMER TYPE FUEL CELL SEPARATOR AND METHOD OF PRODUCTION OF SAME

This application is a divisional of co-pending U.S. application Ser. No. 12/224,429, filed Dec. 1, 2008, and which is the National Stage of PCT International Application No. PCT/JP2007/054143, filed Feb. 27, 2007. PCT International Application No. PCT/JP2007/054143 claims the benefit of priority of Application No. JP 2006-050934, filed in Japan on Feb. 27, 2006. The entire contents of all of the above applications are incorporated herein by reference.

TECHNICAL FIELD

The present invention relates to a solid polymer type fuel cell separator used in an automobile, small-sized power generation system, etc. and a method of production of the same, more particularly relates to a solid polymer type fuel cell separator comprised of stainless steel or titanium or a titanium alloy having a surface layer part at which conductive compound particles are fixed and a method of production of the same.

BACKGROUND ART

A solid polymer type fuel cell is a system fueled using pure hydrogen, hydrogen gas obtained by conversion of alcohol, etc. and electrochemically controlling the reaction between the hydrogen and the oxygen in the air to take out power.

A solid polymer type fuel cell uses a solid hydrogen ion selective permeation type organic membrane as an electrolyte, so can be made more compact compared with a conventional alkali type fuel cell, phosphoric acid type fuel cell, molten carbonate type fuel cell, solid electrolyte type fuel cell, or other fuel cells using as an electrolyte an aqueous solution-based electrolyte, molten salt-based electrolyte, or other fluid medium. Development is underway for application to electric vehicles etc.

The configuration of a typical solid polymer type fuel cell is shown in FIG. 1. A solid polymer type fuel cell 1 is configured by a solid polymer membrane 2 forming an electrolyte, a catalyst electrode part 3 comprised of carbon fine particles and precious metal ultrafine particles provided on the two surfaces of this solid polymer membrane 2, a current collector comprised of a felt-like carbon fiber composite having the function of taking out power generated at this catalyst electrode part 3 as current and supplying the catalyst electrode part 3 with the reaction gas, that is, the oxygen-containing gas or hydrogen-containing gas (usually called "carbon paper 4"), and a separator 5 receiving current from the carbon paper 4 and separating oxygen-containing gas and hydrogen-containing gas stacked together.

The basic principle of the solid polymer type fuel cell 1 is generally as follows: That is, in a solid polymer type fuel cell 1, fuel comprised of hydrogen gas ($H_2$) 8 is supplied from the anode side 6, passes through a gas diffusion layer comprised of the carbon paper 4 and the catalyst electrode part 3, and forms hydrogen ions ($H^+$) which permeate through an electrolyte comprised of the solid polymer membrane 2. At the catalyst electrode part 3 at the cathode side 7, the hydrogen ions ($H^+$) and the oxygen ($O_2$) in the air 9 supplied from the cathode side 7 undergo an oxidation reaction ($2H^+ + 2e^- + 1/2 O_2 \rightarrow H_2O$) whereby water ($H_2O$) is produced. At the time of this oxidation reaction, electrons 10 generated at the catalyst electrode part 3 of the anode side 6 flow through the carbon paper 4 from the separator 5 of the anode side 6 to the separator 5 of the cathode side 7, whereby current and voltage are generated between the two electrodes.

The solid polymer membrane 2 has an electrolyte having a strong acidity fixed in the membrane and functions as an electrolyte allowing permeation of hydrogen ions ($H^+$) by control of the dew point in the cell.

The separators 5, component members of the solid polymer type fuel cell 1, have the function as channels of separating the two types of reaction gases, that is, the air 9 at the cathode side 7 and the hydrogen gas 8 at the anode side 6, and supplying the reaction gases and the function of discharging the water produced by the reaction from the cathode side 7. Further, in general, the solid polymer type fuel cell 1 uses a solid polymer membrane comprised of an electrolyte having a strong acidity. Due to the reaction, it operates at a temperature of about 150° C. or less. Water is produced, so the solid polymer type fuel cell separators 5 are required to have corrosion resistance and durability as material properties and are required to have a good conductivity for allowing current to efficiently pass through the carbon paper 4 and a low contact resistance with the carbon paper.

In the past, as the material of the solid polymer type fuel cell separators, carbon-based materials have been used in large amounts. However, separators comprised of carbon-based materials cannot be made thinner due to the problem of brittleness, so obstruct compactness. In recent years, separators made of hard-to-break carbon-based materials have been developed, but they are expensive cost-wise, so are disadvantageous in economic terms.

On the other hand, separators using metal materials do not have the problem of brittleness compared with carbon-based materials, so in particular enable a solid polymer type fuel cell system to be made more compact. Separators using low cost materials such as stainless steel or titanium or a titanium alloy or other metal materials are being developed. Numerous proposals are being made (see, for example, Japanese Patent Publication (A) No. 2000-260439, Japanese Patent Publication (A) No. 2000-256808, Japanese Patent Publication (A) No. 2004-107704, Japanese Patent Publication (A) No. 2004-156132, Japanese Patent Publication (A) No. 2004-273370, Japanese Patent Publication (A) No. 2004-306128, Japanese Patent Publication (A) No. 2004-124197, Japanese Patent Publication (A) No. 2004-269969, Japanese Patent Publication (A) No. 2003-223904, Japanese Patent Publication (A) No. 2004-2960, and Japanese Patent Publication (A) No. 2004-232074).

However, stainless steel separators or titanium or titanium alloy separators have the problem of a larger contact resistance with carbon paper due to the passivation film formed on their surfaces and therefore a large drop in the energy efficiency of the fuel cell.

For this reason, in the past, numerous proposals have been made for methods for reducing the contact resistance between the surfaces of members of stainless steel separators or titanium and titanium alloy separators and carbon paper.

For example, a separator for a solid polymer type fuel cell reduced in contact resistance with carbon paper by forming a large number of bulging parts on the surface of stainless steel (SUS304) by press forming and forming gold plating layers of predetermined thicknesses on the end faces at the front end sides (see, for example, Japanese Patent Publication (A) No. 2004-265695) or depositing a precious metal or precious metal alloy on the stainless steel or titanium surface (see, for example, Japanese Patent Publication (A) No. 2001-6713) has been proposed. However, these methods require gold plating or other surface treatment forming expensive precious metal layers in order to impart conductivity to the stainless steel or titanium surface, so had the problem of an increase in the production costs of the separator.

On the other hand, various methods have been proposed to reduce the contact resistance between the surface of the separator members and carbon paper while reducing the amounts of the expensive precious metals used or eliminating their use.

For example, in order to reduce the contact resistance between the stainless steel surface and carbon paper, the method of causing the Cr in stainless steel to precipitate as chromium carbides in the annealing process of the stainless steel and raising the carrying capacity of the current received from the carbon paper through the chromium carbides exposed on the surface of the passivation film formed on the stainless steel surface (see, for example, Japanese Patent Publication (A) No. 2000-309854) and the method of providing the stainless steel surface with a coated film in which SiC, $B_4C$, $TiO_2$, or other conductive compound particles are dispersed, then heating this stainless steel in a nonoxidizing atmosphere to 300 to 1100° C. to cause the main ingredients of the coated film to break down and dissipate or coating the surface with a carbide-based conductive ceramic to form the conductive compound particles on the stainless steel surface (see, for example, Japanese Patent Publication (A) No. 11-260383 and Japanese Patent Publication (A) No. 11-219713) are known. However, these methods require a step of long heat treatment to form a conductive compound on the stainless steel surface, so had the problems of a drop in productivity of the separator and increase in production costs. Further, with the method of causing the Cr in stainless steel to precipitate as chromium carbides in the annealing process, when in particular the annealing time is not sufficient, a chrome-deficient layer will form near the chromium carbides in the steel, a local drop in corrosion resistance will occur in this region, and, when press forming the stainless steel to form a gas channel on the separator surface, the chromium carbides may form starting points for cracks in the stainless steel surface.

Further, methods of fixing a carbon layer or carbon particles with a good conductivity on the stainless steel surface have also been proposed. For example, the method of forming a gas channel by press forming etc. the important part where the catalyst electrode is located on the metal sheet, then forming a carbon-based conductive coating layer on that surface (see, for example, Japanese Patent Publication (A) No. 2000-021419), the method of improving the conductivity by dispersing and press bonding carbon powder at the stainless steel surface (see, for example, Japanese Patent Publication (A) No. 11-121018), and the method of forming an Ni—Cr-based plating layer or Ta, Ti, or Ti—Ta-based plating layer in which carbon-based particles are dispersed on the stainless steel surface (see, for example, Japanese Patent Publication (A) No. 11-126621 and Japanese Patent Publication (A) No. 11-126622) are known. However, in the separators made by these methods, due to the pseudo Schottkey barrier formed at the carbon side in the electron structure at the interface of the metal and carbon, a large contact resistance is caused at the interface of the stainless steel and carbon layer or carbon particles and as a result the effect of sufficiently reducing the contact resistance with the carbon paper cannot be obtained.

Further, the method of forming one or more types of conductive ceramic layers of TiN, TiC, CrC, TaC, $B_4C$, SiC, WC, ZrN, CrN, and HfC at the fuel electrode side supplying hydrogen-containing gas in a stainless steel separator (see, for example, Japanese Patent Publication (A) No. 2003-123783) has been proposed. This method forms a conductive ceramic layer by vapor deposition using a vacuum apparatus etc. or dry coating etc., but has the problems of limits to the film-forming speed and an unavoidable drop in the yield of the coated substance, so an increase in the production costs.

Further, the method of fixing hard fine powder having conductivity on the substrate surface by shot etc. has been proposed.

For example, a titanium or titanium alloy separator at the substrate surface of which are buried, dispersed, and exposed conductive hard particles of the $M_{23}C_6$ type, $M_4C$ type, or MC type, where the metal element (M) is at least one of chrome, iron, nickel, molybdenum, tungsten, and boron (see, for example, Japanese Patent Publication (A) No. 2001-357862), and stainless steel and a stainless steel separator in the substrate surface of which are buried, dispersed, and exposed conductive hard particles of at least one of the $M_{23}C_6$ type, $M_4C$ type, $M_2C$ type, and MC type carbide-based metal inclusions and $M_2B$ type boride-based metal inclusions, where the metal element (M) is at least one of chrome, molybdenum, and tungsten, and having a surface roughness of a center line average roughness Ra of 0.06 to 5 μm (see, for example, Japanese Patent Publication (A) No. 2003-193206) have been proposed.

Further, a method of spraying a separator forming a fuel cell with a solid plating material comprised of core particles of a higher hardness than this separator and coated with a metal having a high corrosion resistance and a low contact resistance with carbon so as to forcibly deposit the metal coated on the solid plating material on the separator (see, for example, Japanese Patent Publication (A) No. 2001-250565) and a method of using a similar technique to bury a fine amount of a precious metal in stainless steel or titanium or a titanium alloy to obtain a sufficiently low contact resistance even without coating the entire surface with a precious metal like with gold plating (see, for example, Japanese Patent Publication (A) No. 2001-6713) have been proposed.

The method of fixing hard fine powder having conductivity on the substrate surface by shot etc. is more advantageous than the methods of heat treatment or vacuum deposition in that it does not lower the productivity, is cheaper in product costs, and is simpler as a method. On the other hand, with the method of mechanically burying hard conductive particles in the substrate surface of a metal separator formed into a desired shape by shot etc., distortion may be introduced into the substrate surface layer part resulting in deformation and the flatness of the separator may drop.

In general, a solid polymer type fuel cell has a low output voltage per cell of about 1V, so to obtain the desired output, a large number of fuel cells are often stacked for use as a fuel cell stack. For this reason, in the method of fixing hard fine powder having conductivity on the substrate surface by shot etc., it is necessary to treat the separator under conditions suppressing the occurrence of warping or distortion in the separator and giving a good flatness enabling the fuel cells to be stacked.

Further, the lower the contact resistance of the separator with the carbon paper, the more desirable. For example, a method of depositing metal on a fuel cell separator characterized in that the value of the low contact resistance with the carbon is not more than 20 mΩ·cm² at a contact surface pressure of 1 kg·f/cm² (see, for example, Japanese Patent Publication (A) No. 2001-250565) etc. have been proposed.

In the above way, in the past, metal separators for solid polymer type fuel cells using, as the separator substrate, a metal material superior in corrosion resistance such as stainless steel or titanium or a titanium alloy and improving the contact resistance between the separator substrate surface and carbon paper by using various methods to form a conductive compound layer on the substrate surface or fix conductive compound particles on the surface have been proposed, but these could not be said to have been necessarily sufficient from the viewpoints of the contact resistance and flatness demanded from a solid polymer type fuel cell separator or from the viewpoints of productivity and production costs.

DISCLOSURE OF THE INVENTION

In view of the current state of the prior art, the present invention has as its object the provision of a solid polymer type fuel cell separator comprised of stainless steel, titanium, or a titanium alloy having a surface layer part on which conductive compound particles are fixed, which solid polymer type fuel cell separator being superior in low contact resistance of the fuel cell separator surface with carbon paper and, further, superior in flatness for stacking, and a method of production of the same.

The present invention solves the above problem, that is, has as its gist the following:

(1) A separator for a solid polymer type fuel cell comprising a substrate of stainless steel or titanium or a titanium alloy having a surface layer part on which conductive compound particles are fixed, said separator for a solid polymer type fuel cell characterized in that said conductive compound particles are comprised of one or more types of metal borides, metal carbides, and metal nitrides with an average particle size of 0.01 to 20 μm, said conductive compound particles are present in a region from said substrate surface to a depth of 10 μm, and a distribution of concentration of the metal element forming the conductive compound in said region satisfies relations between a concentration C of the metal element forming the conductive compound and a depth x from the substrate surface shown in the following equation <1> and equation <2>:

$$C = A \cdot \exp(-x/t) + B \quad <1>$$

$$10 \leq A \leq 90, -4.0 \leq B \leq 1.0, 0.5 \leq t \leq 4.0 \quad <2>$$

where, C is the concentration of the metal element forming the conductive compound (mass %), x is the depth from the substrate surface (μm), and A, B, and t are constants determined by the blast treatment conditions of the substrate surface.

(2) A separator for a solid polymer type fuel cell as set forth in (1) characterized in that the metal element forming said conductive compound is one or more of Cr, V, W, Ta, La, Mo, and Nb.

(3) A method of production of a separator for a solid polymer type fuel cell characterized by shaping a substrate comprised of stainless steel, titanium, or a titanium alloy, then spraying said substrate surface with superhard core particles, comprised of conductive compound particles of an average particle size of 0.01 to 20 μm mixed with a coating material and coated on their surfaces, under conditions of a spray pressure of 0.4 MPa or less and a spray amount per cm$^2$ of the substrate of 10 to 100 g in blast treatment, the ratio of said conductive compound to the mass of said core particles being 0.5 to 15 mass %.

BEST MODE FOR CARRYING OUT THE INVENTION

The present invention will be explained in detail below.

Figure 1:
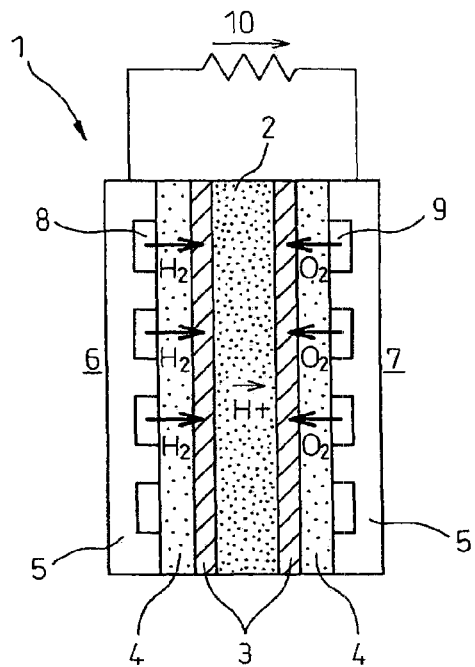
FIG. 1 is a view explaining the configuration of a solid polymer type fuel cell.

As explained above, the separators 5 forming a component member of the solid polymer type fuel cell 1 shown in FIG. 1 are required to have conductivity as one of their basic characteristics, in particular a small contact resistance between the separator 5 surface and carbon paper 4 at the time of receiving current from the carbon paper 4. Further, the solid polymer type fuel cell 1 has a solid polymer membrane made of an electrolyte having a strong acidity. It produces water by a reaction proceeding at a temperature of about 150° C. or less, so the material of the separators 5 is required to have enough corrosion resistance and durability to sufficiently withstand these temperatures and the corrosive environment of an acidic aqueous solution. Further, the solid polymer type fuel cell 1 is often used as a fuel cell stack of a large number of cells stacked to obtain the desired power, so the separators 5 are required to have enough flatness to enable them to be sufficiently applied for stacking of fuel cells.

In view of the above points, the present invention is predicated on a solid polymer type fuel cell separator using a substrate of stainless steel, titanium, or a titanium alloy having good corrosion resistance at the above temperature under a corrosive environment of an acidic aqueous solution and having conductive compound particles superior in corrosion resistance at the surface layer part of this substrate and has as the basic idea of the invention to control the distribution of the content of the conductive compound particles in said substrate in the depth direction from the surface.

First, the basic idea of the present invention and the main parts of the invention will be explained.

The present invention has as a basic constituent requirement a separator having stainless steel, titanium, or a titanium alloy as a substrate and having conductive compound particles comprised of borides, carbides, or nitrides of a metal element fixed at a surface layer part of that substrate by blast treatment. The conductive compound is selected from borides, carbides, or nitrides of a metal element because this gives a compound with little corrosion even in the usage environment of a fuel cell and further having a hardness enabling it to be fixed to the substrate surface by blast treatment.

In the present invention, the reason for making the average particle size of the conductive compound particles 0.01 μm to 20 μm is that if the average particle size of the conductive compound particles is less than 0.01 μm, the effect of the conductive compound particles in reducing the contact resistance of the separator surface is not sufficiently obtained and the low contact resistance aimed for the separator for a solid polymer type fuel cell cannot be obtained.

On the other hand, if the average particle size of the conductive compound particles exceeds 20 μm, when using the later explained sprayed particles comprised of conductive compound particles coated on the surface of superhard core particles for blast treatment of the substrate surface layer part, the conductive compound particles will have a hard time being fixed at the substrate surface layer part or even if being fixed there will easily peel off, so the amount of particles fixed at the substrate surface layer part will decrease and, as a result, the density of conductive compound particles fixed at the substrate surface layer part will fall and the desired low contact resistance between the separator and the carbon paper will no longer be obtained. For this reason, in the present invention, the average particle size of the conductive compound particles was made 0.01 to 20 μm.

The conductive compound has to be present in the region from the separator substrate surface to a depth of 10 μm. The conductive compound present at a position deeper than 10 μm from the substrate surface has little effect in reducing the contact resistance between the separator and the carbon paper and becomes a factor causing distortion at the separator and degrading the mechanical strength of the separator, so is not desirable.

Further, the inventors treated the surfaces of substrates comprised of stainless steel, titanium, and titanium alloys under various conditions by blast treatment and measured the contact resistances between the separators and carbon paper to study the relationship with the state of said conductive compound fixed at the substrate surface layer part.

As a result, they confirmed that to make the contact resistance between the separator and carbon paper the targeted 10 mΩ·cm² or less at a surface pressure of 1 kgf/cm², the relationships of the concentration C of the metal element forming the conductive compound (mass %) in the region of 10 μm or less from the substrate surface and the depth x from the substrate surface (μm) must satisfy the following equation <1> and equation <2>:

$$C = A \cdot \exp(-x/t) + B \quad <1>$$

$$10 \leq A \leq 90, -4.0 \leq B \leq 1.0, 0.5 \leq t \leq 4.0 \quad <2>$$

where, C is the concentration of the metal element forming the conductive compound (mass %), x is the depth from the substrate surface (μm), and A, B, and t are constants determined by the blast treatment conditions of the substrate surface.

The A in equation <1> and equation <2> is a constant determined by the blast treatment conditions of the substrate surface, in particular is a constant determined by the amount of spraying per unit area in blast treatment. To lower the contact resistance between the separator and carbon paper, as shown in said equation <2>, A is made a range of 10 to 90. If A is less than 10, the amount of the conductive compound fixed at the substrate surface is not sufficient and it is difficult to reduce the contact resistance between the separator and the carbon paper to the target value or less.

Further, if A exceeds 90, the conductive compound breaks down and the metal ingredients precipitate at the surface, so the separator surface corrodes under the usage environment of the fuel cell and the contact resistance rises. That is, the conductive compound having the highest concentration of the metal element in the conductive compounds of the present invention is WB, but even if covering the entire surface of the substrate surface with WB, the W concentration at the substrate surface would be 94 mass %. If the W concentration is 94 mass % or more, the WB will decompose in the spraying process and W will precipitate in the metal state and cover the substrate surface. In this state, the separator surface would easily corrode in the usage environment and the corrosion products would increase the contact resistance between the separator and carbon paper. For that reason, in the present invention, the upper limit of the concentration of the metal element stably fixed to the substrate surface in the compound state was made 90 mass %.

Further, the B and t in equation <1> and equation <2> are also constants determined by the conditions of the blast treatment of the substrate surface, in particular are constants determined by the spray pressure at the blast treatment, the amount sprayed per unit area, and the ratio of the conductive compound to the mass of the superhard core particles.

To reduce the contact resistance between the separator and carbon paper, as shown in equation <2>, B is made −4.0 to 1.0. If B is less than −4.0, the amount of the conductive compound fixed to the substrate surface is not sufficient and the contact resistance between the separator and the carbon paper will not become the target value or less.

Further, if B exceeds 1.0, the amount of conductive compound present in the region of a depth of more than 10 μm from substrate surface will increase and problems will arise of distortion in the separator substrate and degraded mechanical strength of the separator. Further, to reduce the contact resistance between the separator and carbon paper, as shown by equation <2>, the t value has to be made 0.5 to 4.0.

Figure 2:
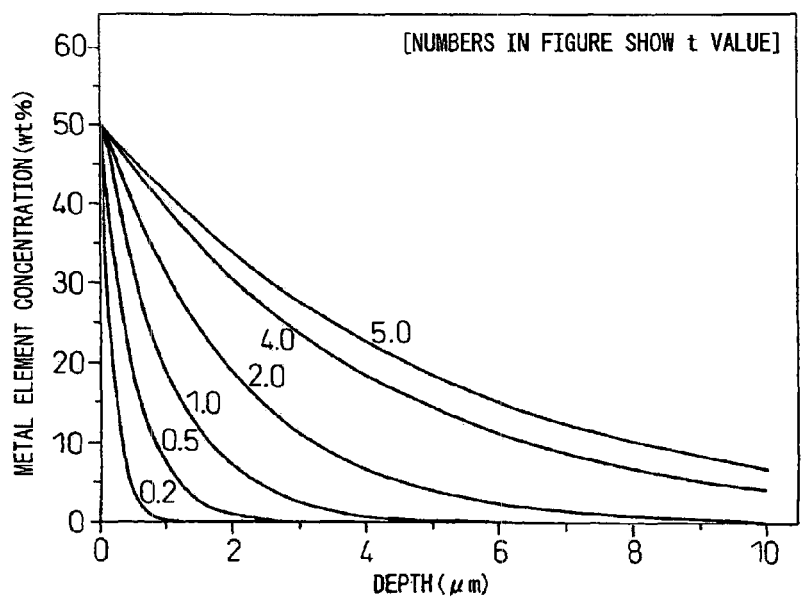
FIG. 2 is a view showing a depth direction distribution of the concentration of a metal element of conductive compound particles at the separator substrate.

FIG. 2 shows the relationship between the t value of equation <1> in the case of changing the t value and the distribution of concentration of the metal element of the conductive compound particles in the depth direction from the substrate surface. The t value is changed to 0.2, 0.5, 1.0, 2.0, 4.0, and 5.0.

As shown in FIG. 2, the deeper from the substrate surface, the smaller the concentration of metal element of the conductive compound particles. This decrease of the concentration of the metal element in the depth direction occurs more rapidly the smaller the t value. When the t value in equation <1> is less than 0.5, for example, when t=0.2 of FIG. 2, the conductive compound falls rapidly in concentration in the depth direction from the surface, the metal element forming the conductive compound is present in a high concentration at only the shallow region from the substrate surface, that is, the extreme surface layer part, the conductive compound will easily detach from the surface layer part due to friction and impact etc. with other members at the time of assembly of the separator, and the effect of reduction of the contact resistance will be degraded, so this is not preferable.

On the other hand, when the t value exceeds 4.0, for example, when t=5.0 of FIG. 2, the metal element forming the conductive compound will be present in a large amount in the region deep from the substrate surface, the ratio of presence of the conductive compound contributing to the reduction of the contact resistance at the surface layer part will become smaller, and the amount of conductive compound at the region deep from the substrate surface, which becomes a cause of distortion and defects of the separator, will increase, so this is not preferable.

From the above, to reduce the contact resistance between the separator and carbon paper to the target value or less and suppress the deterioration of that characteristic at the time of use of the separator, it is necessary to make the t value in equation <1> 0.5 to 4.0. Further, to increase the effect, the smaller the t value, the better. The t value is preferably made not more than 2.0.

If t is 0.5 to 4.0, the density of the conductive compound present at the separator substrate surface will be a density sufficient for contributing to reduction of the contact resistance between the separator substrate and the carbon paper, and detachment of the conductive compound from the separator substrate surface and rise in the contact resistance at the time of processing or assembly can be prevented.

That is, specifically, the distribution of concentration of the conductive compound component metal element at the substrate surface in the depth direction is, at a depth of 0.1 μm from the substrate surface, 4.0 mass % to 89 mass %, at a depth of 0.2 μm, 2.7 mass % to 87 mass %, at a depth of 0.4 μm, 0.4 mass % to 83 mass %, at a depth of 0.5 μm, not more than 81 mass %, at a depth of 1 μm, not more than 72 mass %, at a depth of 2 μm, not more than 56 mass %, at a depth of 3 μm, not more than 44 mass %, at a depth of 4 μm, not more than 35 mass %, at a depth of 5 μm, not more than 27 mass %, at a depth of 6 μm, not more than 22 mass %, at a depth of 7 μm, not more than 17 mass %, at a depth of 8 μm, not more than 14 mass %, and, at a depth of 9 μm, not more than 11 mass %.

More preferably, the distribution of concentration of the conductive compound component metal element at the substrate surface in the depth direction should be, at a depth of 0.1 μm from the substrate surface, 22 mass % to 35 mass %, at a depth of 0.2 μm, 21 mass % to 35 mass %, at a depth of 0.4 μm, 18 mass % to 31 mass %, at a depth of 0.5 μm, 17 mass % to 29 mass %, at a depth of 1 μm, 12 mass % to 22 mass %, at a depth of 2 μm, 6.2 mass % to 13.5 mass %, at a depth of 3 μm, 2.8 mass % to 8.7 mass %, at a depth of 4 μm, 1.1 mass % to 5.1 mass %, at a depth of 5 μm, 0.4 mass % to 2.7 mass %, at a depth of 6 μm, 0.18 mass % to 1.4 mass %, at a depth of 7 μm, 0.07 mass % to 0.7 mass %, at a depth of 8 μm, 0.02 mass % to 0.4 mass %, and, at a depth of 9 μm, 0.01 mass % to 0.2 mass %.

The conductive compound is preferably present in the region within 10 μm from the separator substrate surface. It may be present even in a region of a depth exceeding 10 μm, but the conductive compound present in a region deeper than 10 μm does not contribute to the reduction of the contact resistance between the separator and the carbon paper and can become a factor causing distortion or degrading the mechanical strength.

The conductive compound fixed to the surface layer of the substrate by blast treatment is preferably a compound which has electrical conductivity, has little elution of ions even in the usage environment of the fuel cell, and further has hardness able to be fixed to the substrate surface by blast treatment.

In general, metal borides, metal carbides, and metal nitrides mostly are provided with both conductivity and hardness, so the inventors fixed borides, carbides, and nitrides of various types of metal elements to substrate surfaces by blast treatment and tested them for contact resistance and corrosion resistance in the usage environment of fuel cells. First, for the corrosion resistance test, they immersed particle-state reagents of borides, carbides and nitrides of various types of metal elements having average particle sizes of about 2 μm in an 80° C. sulfuric acid acidic aqueous solution simulating the usage environment of fuel cells for 10 hours or more and investigated the concentrations of metal ions eluted into the aqueous solutions by ICP spectrometry. Further, for the contact resistance test, they sandwiched the immersion treated compound particles and carbon paper between two metal electrode plates, applied a surface pressure of 1 kgf/cm$^2$, measured the resistance value, and used that value to evaluate the contact resistance between the conductive compound particles and carbon paper. As a result, they confirmed that metal borides, metal carbides, and metal nitrides comprised of Cr, V, W, Ta, La, Mo, and Nb are substances with little ion elution and little increase in contact resistance.

Based on the above results of the study, in the present invention, as the conductive compound particles, metal borides, metal carbides, or metal nitrides of one or more types of metal elements selected from Cr, V, W, Ta, La, Mo, and Nb are preferable. Specifically, one or more types of metal compounds from $Cr_3C_2$, $Cr_2N$, $CrB$, $CrB_2$, $VB$, $VC$, $VN$, $W_2B_5$, $W_2C$, $WB$, $WC$, $TaB_2$, $TaC$, $TaN$, $LaB_6$, $MoB_2$, $Mo_2C$, $MoB$, $MoC_2$, $NbC$, and $NbN$ are preferred.

Metal borides, metal carbides, and metal nitrides comprised of other metal elements such as TiC and TiN formed oxides or hydroxides of Ti at the surfaces of the TiN particles and TiC particles in the test resulting in a rise in the resistance value between the metal and carbon paper, so these are not desirable as conductive compound particles.

According to the present invention, it is possible to realize the targeted solid polymer type fuel cell separator made of stainless steel having a contact resistance of the separator with the carbon paper of a low 10 mΩcm$^2$ or less at a surface pressure of 1 kgf/cm$^2$, having little increase of contact resistance at the time of use and little drop in electromotive force due to this, and provided with a flatness enabling sufficient application to stacking of fuel cells.

Next, the method of production of the solid polymer type fuel cell separator of the present invention will be explained below.

In the present invention, as the method for fixing conductive compound particles to the surface layer part after shaping a substrate made of stainless steel, titanium, or titanium alloy, the surface of the substrate is blast treated.

The blast treatment in the present invention and the conditions of the same are as follows. First, superhard core particles made of a material higher in hardness than the separator substrate, for example, tungsten carbide, are covered on their surfaces with the conductive compound particles desired to be fixed to the separator substrate so as to prepare sprayed particles. The method of coating the surface of the superhard core particles with conductive compound particles may be to prepare a suspension of conductive compound particles mixed with a coating solution in advance and coating this suspension on the surfaces of the superhard core particles.

When preparing the suspension, for the reasons explained later, it is prepared so that the ratio with respect to the core particles becomes 0.5 to not more than 1.5 mass %. Note that the type of the coating solution does not have to be particularly limited. For example, polyvinyl alcohol, a methacrylic acid copolymer, etc. may be used.

Further, the ratio of the conductive compound particles in the suspension at this time is preferably 10 to 20 mass %.

The method of coating the suspension on the surface of the superhard core particles may, for example, be to use a centrifugal flow type agitator to agitate the superhard core particles and, while doing so, spray the surfaces of the particles with the suspension so as to form a coating layer containing the conductive compound particles on the surfaces of the particles.

The blast treatment for spraying the sprayed particles covered on their surfaces with conductive compound particles obtained by the above method onto the substrate surface using a flow of dry air or flow of inert gas flow is, for the later explained reasons, performed under the conditions of a spray pressure of 0.4 MPa or less and a spray amount of 10 to 100 g per cm$^2$ of the substrate. In this blast treatment of the substrate, the sprayed core particles strike the separator surface whereby the sprayed particles are driven into the substrate surface to a predetermined depth. Due to the impact, the conductive compound particles covering the surfaces of the sprayed particles peel off and are fixed at a region a predetermined depth from the substrate surface.

The conductive compound particles, for the above-mentioned reasons, are preferably metal borides, metal carbides, or metal nitrides comprised of one or more types of metal elements selected from Cr, V, W, Ta, La, Mo, and Nb. Specifically, one or more types of metal compounds among $Cr_3C_2$, $Cr_2N$, $CrB$, $CrB_2$, $VB$, $VC$, $VN$, $W_2B_5$, $W_2C$, $WB$, $WC$, $TaB_2$, $TaC$, $TaN$, $LaB_6$, $MoB_2$, $Mo_2C$, $MoB$, $MoC_2$, $NbC$, and $NbN$ are preferable.

Further, the lower limit of the average particle size of the conductive compound particles forming the sprayed particles, as explained above, is made 0.01 μm or more since if the average particle size of the conductive compound particles is less than 0.01 μm, the effect of reduction of the contact resistance of the separator surface due to the conductive compound particles is not sufficiently obtained and the low contact resistance targeted for the solid polymer type fuel cell separator is not obtained. On the other hand, the upper limit of the average particle size of the conductive compound particles is made 20 μm or less since if the average particle size exceeds 20 μm, when using spray particles comprised of conductive compound particles covering the surfaces of superhard core particles so as to blast treat the substrate surface layer part, the conductive compound particles will have a hard time being fixed to the substrate surface layer part or even if being fixed will easily peel off, so the amount fixed will become smaller and as a result the density of conductive compound particles fixed to the surface layer part will drop and the desired low contact resistance between the separator and carbon paper will no longer be obtained.

Further, the particle size of the superhard core particles forming the sprayed particles does not affect the contact resistance of the separator surface obtained, so does not have to be limited due to the reason of reducing the contact resistance. However, if the average particle size of the superhard core particles exceeds 200 μm, it will become difficult to obtain a flat separator shape even if adjusting the spray pressure in the blast treatment and will become difficult to stably secure the flatness enabling stacking sought from a solid polymer type fuel cell separator. For this reason, the average particle size of the superhard core particles is preferably 200 μm or less. More preferably, the average particle size of the superhard core particles should be not more than 100 μm.

As explained above, to reduce the contact resistance of the separator of the present invention with carbon paper, it is necessary to make the distribution of concentration of the metal element forming the conductive compound in the region 10 μm or less from the substrate surface satisfy the relationships of equation <1> and equation <2>.

In the present invention, to control the distribution of concentration of the metal element forming the conductive compound particles in the depth direction from the substrate surface so that the t value and B value in equation <1> satisfy the suitable ranges shown in equation <2>, it is necessary, among said blast treatment conditions, to particularly make the ratio of the conductive compound particles to the mass of the core particles in the sprayed particles (mass %) 0.5 to 15 mass % and make the spray pressure of the sprayed particles 0.4 MPa or less.

In the blast treatment, the reason for making the ratio of the conductive compound particles forming the sprayed particles to the mass of the superhard core particles 0.5 to 15 mass % is as follows:

As explained above, in blast treatment, the conductive compound particles coated at the surface of the superhard core particles forming the sprayed particles strike the substrate surface and are driven to a predetermined depth from the surface. Due to the impact at that time, they peel off from the surface of the superhard core particles and are fixed at a predetermined depth region from the substrate surface.

At that time, if the ratio of the conductive compound particles forming the sprayed particles to the mass of the superhard core particles is less than 0.5 mass %, the fixing force between the superhard core particles and the conductive compound particles due to the coating material becomes stronger, the conductive compound particles become hard to peel off from the surface of the core particles at the time of collision of the particles, and the conductive compound particles are buried at positions deep from the substrate surface. As a result, the t value in equation <1> exceeds 4.0 and the B value exceeds 1.0 or outside the suitable ranges of the t value and B value in equation <2> at the high side, distortion and defects occur at the separator surface layer part, and the contact resistance between the separator and carbon paper becomes larger than the targeted value. For this reason, in blast treatment, the ratio of the conductive compound particles forming the sprayed particles to the mass of the core particles is made 0.5 mass % or more.

On the other hand, if the ratio of the conductive compound particles to the mass of the superhard core particles exceeds 15 mass %, the fixing force of the core particles and the conductive compound particles due to the coating material is weak, so the conductive compound particles easily peel off from the surface of the superhard core particles at the time of collision of the sprayed particles, and the conductive compound particles are buried in only the region of a shallow depth from the substrate surface, that is, the extreme surface layer. As a result, the t value of equation <1> becomes less than 0.5 and the B value becomes less than −4.0 or outside the suitable ranges of the t value and B value in equation <2> at the low side, the conductive compound particles easily peel off from the substrate surface at the time of use of the separator, and the contact resistance of the separator increases. For this reason, in blast treatment, the ratio of the conductive compound particles forming the sprayed particles to the mass of the core particles is made not more than 15 mass %.

Further, the reason for making the spray pressure (impact energy) not more than 0.4 MPa in the blast treatment is as follows:

As explained above, in blast treatment, the conductive compound particles covering the surface of the superhard core particles forming the sprayed particles strike the substrate surface and are driven into the surface to a predetermined depth. Due to the impact at that time, they peel off from the surfaces of the superhard core particles and are fixed at a region of a predetermined depth from the substrate surface. At that time, if the spray pressure of the sprayed particles exceeds 0.4 MPa, the conductive compound particles forming the sprayed particles will be buried deeper inside from the substrate surface. As a result, the t value in equation <1> exceeds 4.0, the B value exceeds 1.0, distortion and defects occur at the separator surface layer part, and the contact resistance between the separator and carbon paper becomes larger than the target value. For this reason, in blast treatment, the spray pressure of the sprayed particles is made 0.4 MPa or less.

Further, the reason for making the spray pressure 0.4 MPa or less in blast treatment is not only to reduce the contact resistance of the separator aimed at, but also, as will be explained below, to maintain a good flatness of the separator. That is, if the spray pressure exceeds 0.4 MPa, the amount of distortion of the stainless steel surface layer part increases, the flatness of the separator shape deteriorates, and a stable, good flatness becomes difficult to secure. For this reason, the upper limit of the spray pressure is preferably limited to 0.4 MPa or less. From the viewpoint of improvement of the flatness of the separator shape, more preferably the spray pressure is limited to 0.3 MPa or less. Note that the lower limit of the spray pressure of the sprayed particles in the blast treatment is not particularly defined, but if considering the work efficiency such as the adjustment of the shape of the separator in blast treatment, it is preferably at least 0.01 MPa.

In the present invention, by fixing conductive compound particles at the stainless steel surface layer part in a suitable range in the depth direction from the substrate surface by setting a suitable spray pressure in the blast treatment as explained above, it is possible to obtain the effect of reducing the contact resistance of the separator surface as explained above and also to reduce the warping and twisting of the C direction (direction vertical to rolling direction) occurring when rolling, pressing, or otherwise forming the separator substrate and improve the flatness of the separator shape.

Figure 3:
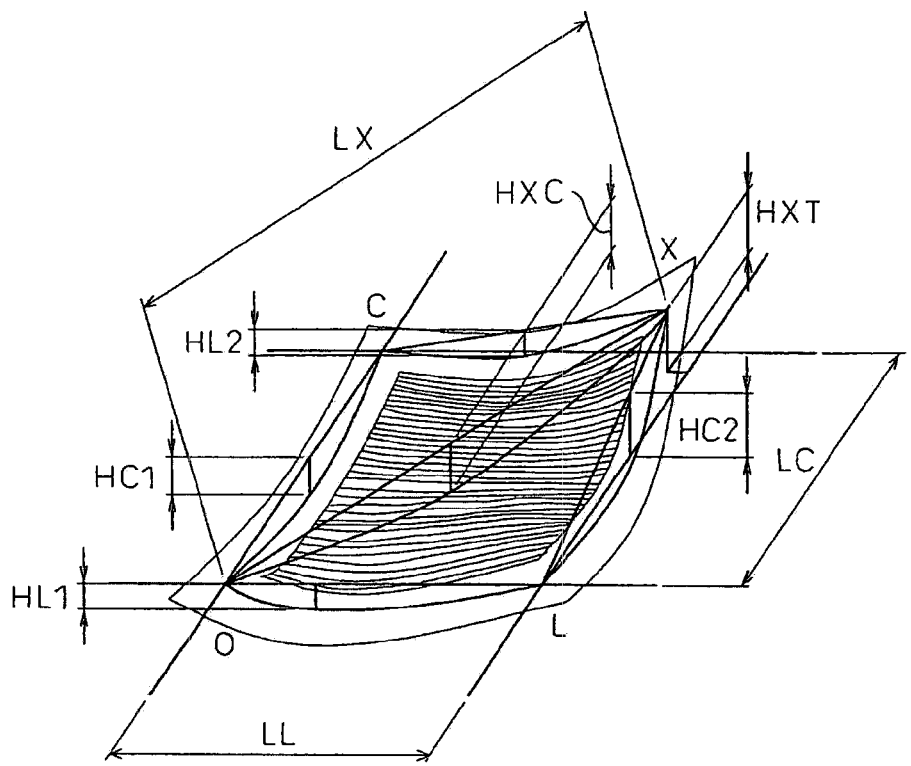
FIG. 3 is a view explaining an indicator for evaluation of the flatness of a stainless steel separator, titanium separator, or titanium alloy separator for a solid polymer type fuel cell treated at the conductive surface by the blast method.

Note that the separator shape can be evaluated for flatness for example as follows:

That is, as shown in FIG. 3, when setting, at predetermined positions near the four corners of a stainless steel separator or titanium separator, an origin O at one corner, L near a corner in the rolling direction of the sheet from the origin O, C near the corner in a direction vertical to the rolling of the sheet from the origin O, and X near the corner in a diagonal direction from the origin O, defining the length of the OL line segment as LL, the length of the OC line segment as LC, and the length of OX as LX, designating the maximum distortion height between the line OL and center plane of the worked article in the thickness direction as HL1, the same with the line CX as HL2, the same with the line OC as HC1, the same with the line LX as HC2, the same with the line OX as HXC, and the distance between the point X and the plane formed by the three points O, L, and C as HXT, the warp rate W and twist rate T are defined by the following equations:

Front side L direction warp rate:

$$W_{L1} = \frac{|HL1|}{LL} \tag{a}$$

Depth side L direction warp rate:

$$W_{L2} = \frac{|HL2|}{LL} \tag{b}$$

Left side C direction warp rate:

$$W_{C1} = \frac{|HC1|}{LC} \tag{c}$$

Right side C direction warp rate:

$$W_{C2} = \frac{|HC2|}{LC} \tag{d}$$

Diagonal direction warp rate:

$$W_{XC} = \frac{|HXC|}{LX} \tag{e}$$

L direction length reference twist rate:

$$T_{XL} = \frac{|HXT|}{LL} \tag{f}$$

C direction length reference twist rate:

$$T_{XC} = \frac{|HXT|}{LC} \tag{g}$$

Based on this, a stainless steel separator and titanium separator having flatnesses such that the values of $W_{L1}$, $W_{L2}$, $W_{C1}$, $W_{C2}$, $W_{XC}$, $T_{XL}$, and $T_{XC}$ become 0.05 or less and having conductive compounds buried in their surfaces are obtained. By using a stainless steel separator and titanium separator having these extents of flatness, formation of a fuel cell stack with a large number of these stacked up becomes easy. The values of $W_{L1}$, $W_{L2}$, $W_{C1}$, $W_{C2}$, $W_{XC}$, $T_{XL}$, and $T_{XC}$ are defined as being 0.05 or less because even with those extents of warping and twisting, formation of a fuel cell stack using the metal separators is possible. With values of $W_{L1}$, $W_{L2}$, $W_{C1}$, $W_{C2}$, $W_{XC}$, $T_{XL}$, and $T_{XC}$ over 0.1, formation of a stack type fuel cell is difficult.

Further, in the present invention, to control the distribution of concentration of the metal element forming the conductive compound particles from the substrate surface (depth direction) so as to make the A value and B value in equation <1> satisfy the suitable ranges shown in equation <2>, it is necessary to make the spray amount of said sprayed particles in particular among the blast treatment conditions 10 to 100 g per $cm^2$ of the substrate. The reason is as follows:

The sum of the A value and B value in equation <1> depends on the concentration of the metal element forming the conductive compound particles of the substrate surface (x=0 μm position). This can be controlled by the amount of the sprayed particles sprayed on the substrate in the blast treatment and the amount sprayed per $cm^2$ of the substrate. The spraying method may be continuous or intermittent. The larger the cumulative spray amount of the sprayed particles, the larger the A value.

Figure 4:
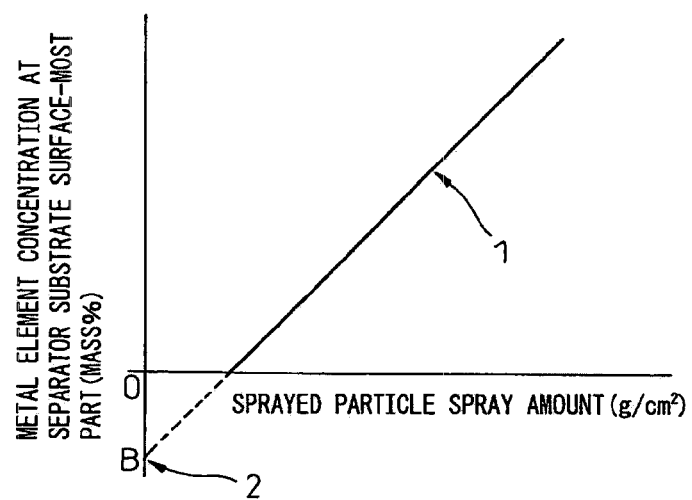
FIG. 4 is a view showing the relationship between the spray amount of sprayed particles per cm$^2$ of the substrate in the case of spraying a conductive polymer compound on the separator substrate by the blast method and the concentration of the metal element forming the conductive compound particles at the surface-most part of the separator substrate.

For example, the relationship between the cumulative spray amount per $cm^2$ of the substrate of the sprayed particles in the blast treatment and the concentration of the metal element forming the conductive compound particles at the surface-most part of the substrate (x=0 μm position of equation <1>) is shown in FIG. 4. The method of quantification of the concentration of the metal element in the conductive compound particles is not particularly limited, but it is possible to measure it using glow discharge spectrometry etc.

The B value in equation <1> is found from the value of the concentration of the metal element of the point 2 intersecting the ordinate (metal element concentration (mass %) of the conductive compound particles at the substrate surface (x=0 μm)) at the point corresponding to the spray amount 0 when extrapolating the line 1 in FIG. 4. Therefore, it is possible to calculate the A value by subtracting the B value from the value of the concentration of the metal element forming the conductive compound at the substrate surface (x=0 μm) in the predetermined spray amount of the line 1.

In the above way, it is possible to using the spraying time of the sprayed particles in the blast treatment to control the A value and B value in equation <1> to the suitable ranges of the A value and B value shown in equation <2>, that is, the A value to 10 to 90 and the B value to −4.0 to 1.0.

When the amount sprayed per cm² in the blast treatment is less than 10 g, the A value of equation <1> is less than 10 and the B value is less than −4.0 or lower than the suitable ranges of equation <2>, the amount of the conductive compound particles fixed to the substrate surface layer part is not sufficient, and the contact resistance between the separator and carbon paper cannot be made the target value or less.

Further, when the spraying time in the blast treatment is 100 g per cm² of the substrate or more, the A value of equation <1> exceeds 90 and the B value exceeds 1.0 or higher than the suitable ranges of equation <2>, the distortion at the substrate in the spraying process becomes large, and the mechanical strength deteriorates. For this reason, in the blast treatment of the present invention, the amount sprayed per cm² of the substrate of the sprayed particles is made 10 to 100 g.

By the method of production of a solid polymer type fuel cell separator of the present invention explained above, it becomes possible to produce a stainless steel, titanium, or titanium alloy solid polymer type fuel cell separator with a contact resistance with carbon paper at the time of use of the solid polymer type fuel cell of a low 10 mΩ·cm² or less at a surface pressure of 1 kgf/cm² and provided with a flatness enabling sufficient application for stacking fuel cells.

EXAMPLES

Below, examples will be used to explain the present invention in detail. High corrosion resistance stainless steel and titanium with lengths of 50 mm, widths of 50 mm, and thicknesses 0.2 mm were used as the substrates of the test materials. As conductive compound particles comprised of borides, carbides, and nitrides of metal elements, average particle size 5 to 50 μm $Cr_3C_2$, $Cr_2N$, CrB, $CrB_2$, VB, VC, VN, $W_2B_5$, $W_2C$, WB, WC, $TaB_2$, TaC, TaN, $LaB_6$, $MoB_2$, $Mo_2C$, MoB, $MoC_2$, NbC, NbN, and their mixtures were used. Each type of these conductive compound particles was charged into a coating solution having a methacrylic acid copolymer as a solute and ethanol as a solvent so as to obtain a suspension which was covered on tungsten carbide superhard core particles having an average particle size of 100 μm to prepare sprayed particles. At this time, the ratios of the conductive compound particles to the mass of the superhard core particles was made 0.5 to 15 mass %.

Next, the sprayed particles were driven into the test substrate surfaces by spray pressures of 0.1 MPa to 0.6 MPa in amounts of 5 to 120 g per cm² of the substrates to obtain test materials. Further, for comparison, conductive compound particles of TiN and TiC were similarly driven into test substrates by the blast method of similar conditions to obtain test materials. Details of the test materials and production conditions are shown in Table 1 and Table 2 (Continuation 1 of Table 1), Table 3 (Continuation 2 of Table 1), and Table 4 (Continuation 3 of Table 1).

The distribution of the concentration, from the surface to the inside of the separator substrate, of the conductive compound particles fixed to the separator substrate by the blast treatment was quantitatively analyzed by glow discharge spectrometry. The distribution of the metal element in the depth direction was analyzed by regression using equation <1> as a regression formula and the values of A, B, and t were calculated.

The amount of elution of metal ions from the conductive compound particles buried in the separator substrate surface was confirmed by the following test method. The test material was allowed to stand in 300 ml of a sulfuric acid aqueous solution adjusted to pH 2 at 80° C. for 300 hours while bubbling oxygen or hydrogen, then the amount of elution of metal ions in the supernatant obtained was quantified by ICP spectrometry. An amount of elution of metal ions in the sulfuric acid aqueous solution of not more than 50 ppm was judged as a passing ion elution characteristic, while one of over 50 ppm was judged as a failing one.

After the metal ion elution test, the value of the contact resistance with carbon paper was measured at a surface pressure of 1 kgf/cm². When the value of the measured contact resistance was 10 mΩcm² or less, the contact resistance was judged to be passing, while when it was over 10 mΩcm², the contact resistance was judged to be failing. Further, when all of the values of $W_{L1}$, $W_{L2}$, $W_{C1}$, $W_{C2}$, $W_{XC}$, $T_{XL}$, and $T_{XC}$ showing the flatness of the separator do not exceed 0.05, the flatness was judged to be passing, while when even one value exceeded 0.05, the flatness was judged to be failing.

Table 1 and Table 2 (Continuation 1 of Table 1), Table 3 (Continuation 2 of Table 1), and Table 4 (Continuation 2 of Table 1) show the test results along with the production conditions.

TABLE 1

| Test material | Substrate | Type of conductive compound Figures in parentheses show mass % | Conductive compound average particle size (μm) | Ratio of to conductive compound particles to core particles weight (mass %) | Blast spray pressure (MPa) | Spray amount of sprayed particles (g/cm²) | Concentration of metal element in conductive compound Coefficients A, B, and t of C = A · exp (−x/t) + B (mass %) | | | Eval. of contact resistance | Eval. of ion elution | Eval. of flatness | Class |
|---|---|---|---|---|---|---|---|---|---|---|---|---|---|
| | | | | | | | A | B | t | | | | |
| 1 | Stainless steel | $Cr_3C_2$ | 40 | 10 | 0.2 | 30 | 21 | −1.1 | 2.1 | X | ○ | ○ | Comp. ex. |
| 2 | Stainless steel | $Cr_3C_2$ | 7 | 10 | 0.2 | 20 | 53 | −2.6 | 0.7 | ○ | ○ | ○ | Inv. |
| 3 | Stainless steel | $Cr_2N$ | 7 | 10 | 0.2 | 5 | 7 | −1.1 | 2.2 | X | ○ | ○ | Comp. ex. |
| 4 | Stainless steel | $Cr_2N$ | 7 | 10 | 0.3 | 50 | 35 | −0.5 | 2.5 | ○ | ○ | ○ | Inv. |
| 5 | Titanium | $CrB_2$ | 5 | 0.1 | 0.2 | 60 | 54 | 0.2 | 4.9 | X | ○ | ○ | Comp. ex. |
| 6 | Titanium | $CrB_2$ | 5 | 10 | 0.2 | 30 | 53 | −0.9 | 2.5 | ○ | ○ | ○ | Inv. |
| 7 | Titanium | VB | 10 | 10 | 0.6 | 30 | 51 | 1.7 | 4.8 | X | ○ | X | Comp. ex. |
| 8 | Titanium | VB | 10 | 10 | 0.2 | 30 | 43 | −1.9 | 1.1 | ○ | ○ | ○ | Inv. |
| 9 | Titanium | VC | 5 | 20 | 0.2 | 20 | 15 | −4.1 | 0.4 | X | ○ | ○ | Comp. ex. |
| 10 | Titanium | VC | 5 | 10 | 0.1 | 30 | 50 | −1.3 | 2.3 | ○ | ○ | ○ | Inv. |
| 11 | Titanium | VN | 10 | 10 | 0.6 | 20 | 50 | 1.7 | 5.0 | X | ○ | X | Comp. ex. |
| 12 | Titanium | VN | 5 | 5 | 0.2 | 30 | 45 | −3.1 | 1.1 | ○ | ○ | ○ | Inv. |

TABLE 1-continued

| Test material | Substrate | Type of conductive compound Figures in parentheses show mass % | Conductive compound average particle size (μm) | Ratio of to conductive compound particles to core particles weight (mass %) | Blast spray pressure (MPa) | Spray amount of sprayed particles (g/cm²) | Concentration of metal element in conductive compound Coefficients A, B, and t of C = A · exp (−x/t) + B (mass %) | | | Eval. of contact resistance | Eval. of ion elution | Eval. of flatness | Class |
|---|---|---|---|---|---|---|---|---|---|---|---|---|---|
| | | | | | | | A | B | t | | | | |
| 13 | Stainless steel | W₂B₅ | 10 | 10 | 0.6 | 50 | 50 | 2.0 | 5.5 | X | ○ | X | Comp. ex. |
| 14 | Stainless steel | W₂B₅ | 10 | 10 | 0.2 | 30 | 30 | −0.6 | 2.5 | ○ | ○ | ○ | Inv. |
| 15 | Stainless steel | W₂B | 2 | 10 | 0.2 | 5 | 2 | −1.0 | 2.0 | X | ○ | ○ | Comp. ex. |
| 16 | Stainless steel | W₂B | 2 | 7 | 0.2 | 30 | 30 | −0.7 | 2.5 | ○ | ○ | ○ | Inv. |
| 17 | Titanium | W₂C | 5 | 0.1 | 0.2 | 40 | 50 | 0.2 | 5.0 | X | ○ | ○ | Comp. ex. |
| 18 | Titanium | W₂C | 5 | 10 | 0.1 | 40 | 45 | −2.7 | 0.8 | ○ | ○ | ○ | Inv. |
| 19 | Titanium | WB | 10 | 10 | 0.6 | 40 | 51 | 1.9 | 4.8 | X | ○ | X | Comp. ex. |
| 20 | Titanium | WB | 5 | 10 | 0.2 | 30 | 52 | −0.9 | 2.1 | ○ | ○ | ○ | Inv. |

TABLE 2

(Continuation 1 of Table 1)

| Test material | Substrate | Type of conductive compound Figures in parentheses show mass % | Conductive compound average particle size (μm) | Ratio of to conductive compound particles to core particles weight (mass %) | Blast spray pressure (MPa) | Spray amount of sprayed particles (g/cm²) | Concentration of metal element in conductive compound Coefficients A, B, and t of C = A · exp (−x/t) + B (mass %) | | | Eval. of contact resistance | Eval. of ion elution | Eval. of flatness | Class |
|---|---|---|---|---|---|---|---|---|---|---|---|---|---|
| | | | | | | | A | B | t | | | | |
| 21 | Titanium | WC | 5 | 25 | 0.2 | 15 | 15 | −5.1 | 0.1 | X | ○ | ○ | Comp. ex. |
| 22 | Titanium | WC | 5 | 12 | 0.2 | 40 | 42 | −2.1 | 1.2 | ○ | ○ | ○ | Inv. |
| 23 | Stainless steel | TaB₂ | 5 | 10 | 0.2 | 7 | 5 | −1.3 | 2.3 | X | ○ | ○ | Comp. ex. |
| 24 | Stainless steel | TaB₂ | 5 | 7 | 0.2 | 20 | 30 | −0.4 | 2.5 | ○ | ○ | ○ | Inv. |
| 25 | Titanium | TaB₂ | 50 | 10 | 0.2 | 15 | 20 | −1.1 | 2.1 | X | ○ | ○ | Comp. ex. |
| 26 | Titanium | TaB₂ | 5 | 10 | 0.2 | 40 | 50 | −1.2 | 2.2 | ○ | ○ | ○ | Inv. |
| 27 | Titanium | TaC | 50 | 10 | 0.2 | 15 | 20 | −1.3 | 2.5 | X | ○ | ○ | Comp. ex. |
| 28 | Titanium | TaC | 5 | 0.1 | 0.2 | 50 | 50 | 0.2 | 5.2 | X | ○ | ○ | Comp. ex. |
| 29 | Titanium | TaC | 5 | 10 | 0.1 | 30 | 41 | −2.1 | 0.9 | ○ | ○ | ○ | Inv. |
| 30 | Titanium | TaC | 5 | 7 | 0.2 | 20 | 29 | −0.6 | 2.6 | ○ | ○ | ○ | Inv. |
| 31 | Titanium | TaC | 5 | 10 | 0.2 | 90 | 54 | −1.1 | 2.1 | ○ | ○ | ○ | Inv. |
| 32 | Titanium | TaC | 5 | 12 | 0.2 | 30 | 42 | −0.2 | 1.1 | ○ | ○ | ○ | Inv. |
| 33 | Titanium | TaC | 5 | 10 | 0.3 | 30 | 44 | −0.5 | 3.1 | ○ | ○ | ○ | Inv. |
| 34 | Stainless steel | TaN | 50 | 10 | 0.2 | 15 | 21 | −1.1 | 2.2 | X | ○ | ○ | Comp. ex. |
| 35 | Stainless steel | TaN | 5 | 0.1 | 0.2 | 50 | 52 | 0.1 | 5.3 | X | ○ | ○ | Comp. ex. |
| 36 | Stainless steel | TaN | 5 | 10 | 0.1 | 40 | 43 | −2.3 | 0.9 | ○ | ○ | ○ | Inv. |
| 37 | Stainless steel | TaN | 5 | 5 | 0.2 | 30 | 33 | −0.6 | 2.4 | ○ | ○ | ○ | Inv. |
| 38 | Stainless steel | TaN | 5 | 10 | 0.2 | 95 | 52 | −1.1 | 2.3 | ○ | ○ | ○ | Inv. |
| 39 | Stainless steel | TaN | 5 | 15 | 0.2 | 50 | 48 | −2.1 | 1.2 | ○ | ○ | ○ | Inv. |

TABLE 3

(Continuation 1 of Table 2)

| Test material | Substrate | Type of conductive compound Figures in parentheses show mass % | Conductive compound average particle size (μm) | Ratio of to conductive compound particles to core particles weight (mass %) | Blast spray pressure (MPa) | Spray amount of sprayed particles (g/cm²) | Concentration of metal element in conductive compound Coefficients A, B, and t of C = A · exp (−x/t) + B (mass %) A | B | t | Eval. of contact resistance | Eval. of ion elution | Eval. of flatness | Class |
|---|---|---|---|---|---|---|---|---|---|---|---|---|---|
| 40 | Stainless steel | TaN | 5 | 10 | 0.3 | 45 | 47 | −0.6 | 3.1 | ○ | ○ | ○ | Inv. |
| 41 | Stainless steel | TaN | 5 | 10 | 0.2 | 5 | 3 | −1.1 | 2.4 | X | ○ | ○ | Comp. ex. |
| 42 | Stainless steel | TaN | 10 | 10 | 0.5 | 45 | 51 | 1.6 | 4.7 | X | ○ | X | Comp. ex. |
| 43 | Stainless steel | TaN | 5 | 20 | 0.2 | 10 | 17 | −4.6 | 0.3 | X | ○ | ○ | Comp. ex. |
| 44 | Titanium | TaN | 50 | 10 | 0.2 | 15 | 21 | −1.1 | 2.3 | X | ○ | ○ | Comp. ex. |
| 45 | Titanium | TaN | 5 | 0.2 | 0.2 | 40 | 52 | 0.2 | 5.5 | X | ○ | ○ | Comp. ex. |
| 46 | Titanium | TaN | 5 | 10 | 0.1 | 40 | 41 | −2.1 | 0.8 | ○ | ○ | ○ | Inv. |
| 47 | Titanium | TaN | 5 | 8 | 0.2 | 35 | 32 | −0.6 | 2.7 | ○ | ○ | ○ | Inv. |
| 48 | Titanium | TaN | 5 | 10 | 0.2 | 50 | 52 | −1.1 | 2.1 | ○ | ○ | ○ | Inv. |
| 49 | Titanium | TaN | 5 | 12 | 0.2 | 40 | 48 | −2.1 | 1.4 | ○ | ○ | ○ | Inv. |
| 50 | Titanium | TaN | 5 | 10 | 0.3 | 40 | 45 | −0.4 | 3.5 | ○ | ○ | ○ | Inv. |
| 51 | Titanium | TaN | 5 | 10 | 0.2 | 6 | 5 | −1.1 | 2.1 | X | ○ | ○ | Comp. ex. |
| 52 | Titanium | TaN | 10 | 10 | 0.5 | 50 | 51 | 1.6 | 4.6 | X | ○ | X | Comp. ex. |
| 53 | Titanium | TaN | 5 | 25 | 0.2 | 15 | 16 | −4.6 | 0.3 | X | ○ | ○ | Comp. ex. |
| 54 | Stainless steel | TiN | 5 | 10 | 0.2 | 40 | 55 | −1.3 | 2.1 | X | X | ○ | Comp. ex. |
| 55 | Titanium | TiC | 5 | 15 | 0.2 | 40 | 43 | −2.4 | 1.1 | X | X | ○ | Comp. ex. |
| 56 | Titanium | TaN(50%) + WC(50%) | 5 | 10 | 0.2 | 6 | 5 | −1.1 | 2.2 | X | ○ | ○ | Comp. ex. |
| 57 | Titanium | TaN(50%) + WC(50%) | 10 | 10 | 0.5 | 50 | 51 | 1.6 | 4.7 | X | ○ | X | Comp. ex. |
| 58 | Titanium | TaN(50%) + WC(50%) | 5 | 25 | 0.2 | 15 | 16 | −4.7 | 0.3 | X | ○ | ○ | Comp. ex. |
| 59 | Titanium | TaN(50%) + WC(50%) | 50 | 10 | 0.2 | 20 | 19 | −1.2 | 2.1 | X | ○ | ○ | Comp. ex. |

TABLE 4

(Continuation 1 of Table 3)

| Test material | Substrate | Type of conductive compound Figures in parentheses show mass % | Conductive compound average particle size (μm) | Ratio of to conductive compound particles to core particles weight (mass %) | Blast spray pressure (MPa) | Spray amount of sprayed particles (g/cm²) | Concentration of metal element in conductive compound Coefficients A, B, and t of C = A · exp (−x/t) + B (mass %) A | B | t | Eval. of contact resistance | Eval. of ion elution | Eval. of flatness | Class |
|---|---|---|---|---|---|---|---|---|---|---|---|---|---|
| 60 | Titanium | TaN(50%) + WC(50%) | 5 | 0.2 | 0.2 | 40 | 49 | 0.1 | 5.4 | X | ○ | ○ | Comp. ex. |
| 61 | Titanium | TaN(50%) + WC(50%) | 5 | 10 | 0.1 | 40 | 39 | −2.1 | 0.9 | ○ | ○ | ○ | Inv. |
| 62 | Titanium | TaN(50%) + WC(50%) | 5 | 7 | 0.2 | 40 | 31 | −0.5 | 2.4 | ○ | ○ | ○ | Inv. |
| 63 | Titanium | TaN(50%) + WC(50%) | 5 | 10 | 0.2 | 40 | 51 | −1.0 | 2.3 | ○ | ○ | ○ | Inv. |
| 64 | Titanium | TaN(50%) + WC(50%) | 5 | 15 | 0.2 | 40 | 39 | −2.1 | 1.2 | ○ | ○ | ○ | Inv. |
| 65 | Titanium | TaN(50%) + WC(50%) | 5 | 10 | 0.3 | 40 | 38 | −0.6 | 3.1 | ○ | ○ | ○ | Inv. |
| 66 | Titanium | TaN(50%) + WC(50%) | 5 | 10 | 0.2 | 5 | 5 | −1.2 | 2.7 | X | ○ | ○ | Comp. ex. |
| 67 | Titanium | TaN(50%) + WC(50%) | 10 | 10 | 0.5 | 50 | 47 | 1.5 | 4.6 | X | ○ | X | Comp. ex. |
| 68 | Titanium | TaN(50%) + WC(50%) | 5 | 20 | 0.2 | 40 | 45 | −4.5 | 0.2 | X | ○ | ○ | Comp. ex. |
| 69 | Stainless steel | TaC(50%) + WC(50%) | 5 | 25 | 0.2 | 15 | 16 | −4.5 | 0.2 | X | ○ | ○ | Comp. ex. |
| 70 | Stainless steel | TaC(50%) + WC(50%) | 5 | 7 | 0.2 | 25 | 31 | −0.5 | 2.4 | ○ | ○ | ○ | Inv. |

TABLE 4-continued (Continuation 1 of Table 3)

| Test material | Substrate | Type of conductive compound Figures in parentheses show mass % | Conductive compound average particle size (μm) | Ratio of to conductive compound particles to core particles weight (mass %) | Blast spray pressure (MPa) | Spray amount of sprayed particles (g/cm²) | Concentration of metal element in conductive compound Coefficients A, B, and t of C = A · exp (−x/t) + B (mass %) | | | Eval. of contact resistance | Eval. of ion elution | Eval. of flatness | Class |
|---|---|---|---|---|---|---|---|---|---|---|---|---|---|
| | | | | | | | A | B | t | | | | |
| 71 | Titanium | TaN(50%) + WC(50%) | 5 | 0.3 | 0.2 | 55 | 52 | 0.1 | 5.1 | X | ◯ | ◯ | Comp. ex. |
| 72 | Titanium | TaN(50%) + WC(50%) | 5 | 10 | 0.1 | 40 | 41 | −2.0 | 0.9 | ◯ | ◯ | ◯ | Inv. |
| 73 | Stainless steel | TaB$_2$(50%) + WB(50%) | 10 | 10 | 0.5 | 40 | 51 | 1.5 | 4.7 | X | ◯ | X | Comp. ex. |
| 74 | Stainless steel | TaB$_2$(50%) + WB(50%) | 5 | 10 | 0.2 | 40 | 51 | −1.0 | 2.1 | ◯ | ◯ | ◯ | Inv. |
| 75 | Titanium | TaC(50%) + WB(50%) | 5 | 20 | 0.2 | 15 | 17 | −4.5 | 0.2 | X | ◯ | ◯ | Comp. ex. |
| 76 | Titanium | TaC(50%) + WB(50%) | 5 | 10 | 0.2 | 45 | 48 | −1.0 | 2.4 | ◯ | ◯ | ◯ | Inv. |
| 78 | Stainless steel | TaN(50%) + WC(50%) | 5 | 10 | 0.2 | 110 | 91 | 1.5 | 6.0 | ◯ | ◯ | X | Comp. ex. |
| 79 | Titanium | TaN(50%) + WC(50%) | 5 | 10 | 0.2 | 120 | 92 | 1.6 | 5.5 | ◯ | ◯ | X | Comp. ex. |

In Table 1 to Table 4, the Test Materials 1, 25, 27, 34, 44, and 59 are comparative examples where the average particle sizes of the conductive compounds are outside the range prescribed in the present invention, so the amounts of conductive compounds fixed to the separator substrates are not sufficient and the contact resistances between the separators and the carbon paper are not satisfactory.

Further, the Test Materials 5, 9, 17, 21, 28, 35, 43, 45, 53, 58, 60, 68, 69, 71, and 75 are comparative examples where the mixed ratios of the conductive compound particles in the coating material at the surfaces of the core particles are outside the range prescribed in the present invention, so the B value and the t value are outside the suitable ranges of equation <2> and the contact resistances between the separators and the carbon paper are not satisfactory.

Further, the Test Materials 7, 11, 13, 19, 42, 52, 57, 67, and 73 are comparative examples where the blast treatment spray pressures are outside the range prescribed in the present invention, so the B values and the t values are outside the suitable ranges of equation <2> and the contact resistances between the separators and the carbon paper and the flatness are not satisfactory.

Further, the Test Materials 3, 15, 23, 41, 51, 56, and 66 are comparative examples where the amounts sprayed per cm² of the substrates in blast treatment are small, so the A values are outside the suitable range of equation <2> and the contact resistances between the separators and the carbon paper are not satisfactory.

Further, the Test Materials 54 and 55 have conductive compound particles outside the range prescribed in the present invention, so the contact resistances between the separators and the carbon paper and the ion elution property are not satisfactory.

Further, the Test Materials 78 and 79 are comparative examples where the amounts sprayed per cm² of the substrates 1 in blast treatment exceed the range prescribed in the present invention, so the A values, B values, and t values are outside the suitable ranges of equation <2> and the flatnesses of the separators are not satisfactory.

On the other hand, Test Materials 2, 4, 6, 8, 10, 12, 14, 16, 18, 20, 22, 24, 26, 29, 30, 31, 32, 33, 36, 37, 38, 39, 40, 46, 47, 48, 49, 50, 61, 62, 63, 64, 65, 70, 72, 74, and 76 have average particle sizes of the conductive compounds, A values, B values, and t values of equation <1>, types of conductive compounds, mixed ratios of the conductive compounds in the coating material at the surfaces of the core particles, spray pressures at the blast treatment, and spray amounts per cm² of the substrate all within the ranges prescribed in the present invention, so were satisfactory in the contact resistances between the separator and the carbon paper, ion elution properties, flatnesses of the separators, etc.

INDUSTRIAL APPLICABILITY

According to the present invention, it becomes possible to provide a solid polymer type fuel cell separator made of stainless steel, titanium, or titanium alloy with a low contact resistance with carbon paper of 10 mΩ·cm² or less at a surface pressure of 1 kgf/cm² at the time of use of the solid polymer type fuel cell and provided with a flatness enabling sufficient application for stacking fuel cells.

The invention claimed is:

1. A method of production of a separator for a solid polymer type fuel cell characterized by shaping a substrate comprised of stainless steel, titanium, or a titanium alloy, then spraying a surface of said substrate with superhard core particles that are coated with a mixture of conductive compound particles of an average particle size of 0.01 to 20 μm and a coating material under conditions of a spray pressure of 0.4 MPa or less and a spray amount per cm² of the substrate of 10 to 100 g in blast treatment, the ratio of said conductive compound to the mass of said superhard core particles being 7 to 15 mass %;
wherein the conductive compound particles are selected from the group consisting of metal borides, metal carbides, and metal nitrides wherein the metal element is one or more of Cr, W, Ta, La, or Mo.

* * * * *